(12) United States Patent
Formoso et al.

(10) Patent No.: US 11,964,764 B2
(45) Date of Patent: Apr. 23, 2024

(54) TARGET MARKING DEVICE AND TARGET TRACKING AND PROCESSING SYSTEMS COMPRISING SUCH A DEVICE

(71) Applicant: MBDA FRANCE, Le Plessis-Robinson (FR)

(72) Inventors: Mathias Formoso, Le Plessis-Robinson (FR); Vincent Jeauneau, Le Plessis-Robinson (FR); Alexandre Kotenkoff, Le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 189 days.

(21) Appl. No.: 17/599,064

(22) PCT Filed: Apr. 10, 2020

(86) PCT No.: PCT/EP2020/060349
§ 371 (c)(1),
(2) Date: Sep. 28, 2021

(87) PCT Pub. No.: WO2020/212290
PCT Pub. Date: Oct. 22, 2020

(65) Prior Publication Data
US 2022/0177129 A1 Jun. 9, 2022

(30) Foreign Application Priority Data
Apr. 16, 2019 (FR) ...................................... 1903983

(51) Int. Cl.
*B64C 39/02* (2023.01)
*B64D 47/02* (2006.01)
(Continued)

(52) U.S. Cl.
CPC ............ *B64C 39/024* (2013.01); *B64D 47/02* (2013.01); *F41G 3/145* (2013.01); *B64U 2101/00* (2023.01); *B64U 2101/15* (2023.01)

(58) Field of Classification Search
CPC ....... B64C 39/024; B64D 47/02; F41G 3/145; B64U 2101/00; B64U 2101/15
See application file for complete search history.

(56) References Cited

U.S. PATENT DOCUMENTS

2002/0112640 A1    8/2002   Brown et al.
2010/0083862 A1*   4/2010   Ciesiun ................... F42B 12/78
                                                                    156/146
(Continued)

FOREIGN PATENT DOCUMENTS

EP    1659359 A1    5/2006
EP    2597415 A2    5/2013
(Continued)

OTHER PUBLICATIONS

U.S. Air Force, MQ-9 Reaper, www.af.mi./about-US/Fact-Sheets/Display/ARticle/1044/mq-9-reaper/, Sep. 23, 2015, pp. 1-3.

*Primary Examiner* — Michael D Lang
(74) *Attorney, Agent, or Firm* — BROWDY AND NEIMARK, P.L.L.C.

(57) ABSTRACT

The target marking device (1) comprises a drone (2) which is provided with at least one transmitter (4), the transmitter (4) comprising an activation element (10) for activating it so that it transmits at a given time a signal (S) which represents a position information item, the transmitter (4) being configured to transmit at least one of the following signals: an infrared signal, a light signal, a sound signal, a signal generated by a chemical substance, the target marking (Continued)

device (1) being part of a target tracking system (6) and/or a target processing system which is provided with movable machinery (7).

17 Claims, 5 Drawing Sheets

(51) Int. Cl.
*B64U 101/00* (2023.01)
*B64U 101/15* (2023.01)
*F41G 3/14* (2006.01)

(56) References Cited

U.S. PATENT DOCUMENTS

2019/0187724 A1* 6/2019 Li ..................... G05D 1/0676
2020/0027326 A1* 1/2020 Ravat ................ G08B 13/26

FOREIGN PATENT DOCUMENTS

FR          3016690 A1    7/2015
RU          2625691 C1 *  7/2017
WO     2006086527 A1    8/2006

* cited by examiner

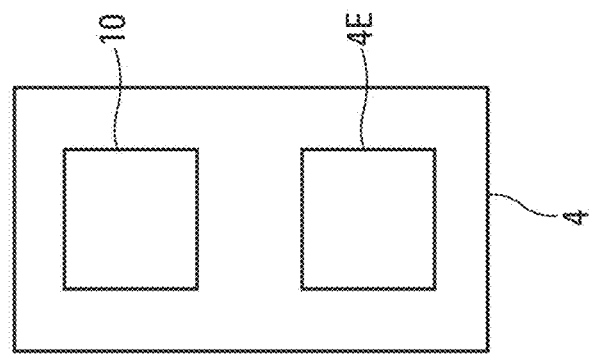
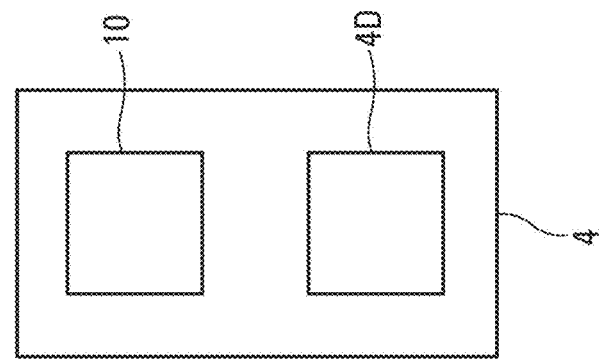
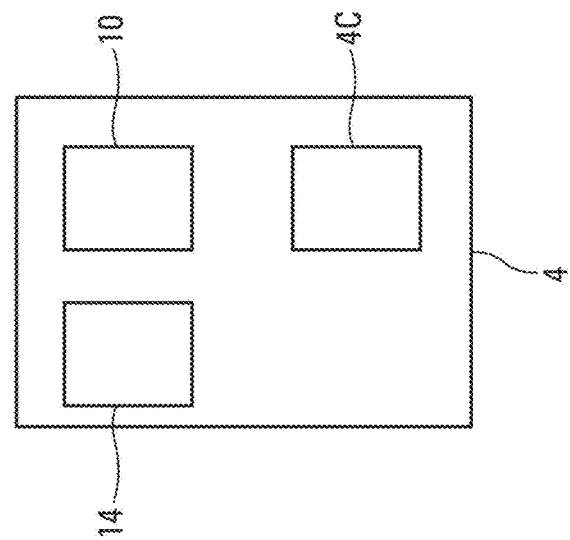

TARGET MARKING DEVICE AND TARGET TRACKING AND PROCESSING SYSTEMS COMPRISING SUCH A DEVICE

TECHNICAL FIELD

The present invention relates to a target marking device and target tracking and processing systems comprising such a target marking device.

PRIOR ART

Although not exclusively, the present invention applies more particularly to the military field and to the neutralization of a target, such as a tank for example, by means of at least one missile.

By the document FR-3 016 690, a target marking device is known which comprises at least one drone of reduced size, which is configured to fly at low height and to be guided using guidance commands, in order to approach a target and mark it. The marking is carried out by means of an active emitter which is mounted on the target marking device and which is configured to generate the emission of an electromagnetic signal, of the radio frequency type.

This target marking device can be integrated into a neutralization system of a target. The neutralization system also comprises a missile for neutralizing the target, which is directed at the marking of the target carried out by the drone.

Thus, with the target marking carried out by the drone, it is not necessary for the missile (or an operator) to emit signals, in particular a target designation beam, for the guidance of the neutralization missile to the target. The missile is therefore discreet.

Such a target marking device and thus such a neutralization system, which have important advantages, are, however, not completely discreet. The environment around the target may, in fact, comprise detectors capable of detecting radio frequency signals (and in particular those used for the marking), often used in the military field.

Furthermore, the document EP-1 659 359 describes an ammunition or ammunition component device comprising a pyrotechnic charge associated with a shell. The pyrotechnic charge of the ammunition can take two forms. It may be either an explosive charge capable of delivering a chemical and/or mechanical energy or a combustible pyrotechnic charge capable of generating, for example, chemical, smoke, light or sound effects. The ammunition can perform destructive missions or protective missions by masking, decoying or jamming.

It is an object of the present invention to improve, in particular, a target marking device.

SUMMARY OF THE INVENTION

The present invention relates to a target marking device comprising at least one drone provided with at least one emitter capable of emitting a positional information, which allows to remedy the above-mentioned drawback.

To this end, according to the invention, the emitter comprises an activation element (capable of being controlled) for activating said emitter so that it emits at least one signal representing the positional information at least at a given time, and the emitter is configured to emit at least one of the following signals: an infrared signal, a light signal, a sound signal, a signal generated by a chemical substance.

Thus, the invention allows to emit various signals, other than radio frequency signals, for which, in the case of a military application, the risk of being in the presence of appropriate detectors (enemy) is low. As a result, a target marking device is provided with an emitter that is very discreet, allowing it to approach a target without being detected if necessary.

In addition, the activation element may be controlled to activate the emission of the signal at particular times, and in particular ways, such as intermittently for certain applications, thereby allowing to carry out a discreet and/or efficient signal emission (i.e. easily detectable by an associated appropriate detector).

The emission of the signal is specifically intended to mark the target, i.e. to leave a detectable mark (or trace), corresponding to positional information allowing to track the target. The emitted signal is generated for the purpose of marking the target. In general, it can be repeated at desired times. The emitter can usually be remotely activated and deactivated at will.

Furthermore, in the scope of the present invention, the emitter can be of various types, very different from each other, as specified below, which allows a flexibility in the use and implementation of the invention.

Furthermore, in a particular embodiment, the drone is provided with a plurality of emitters of the same or different types.

In a first embodiment, the emitter is configured to emit an infrared signal. Advantageously, in this case, the emitter configured to emit the infrared signal comprises one of the following heat sources: a heat source of chemical type, a heat source of electrical type.

In a second embodiment, the emitter is configured to emit a light signal. Advantageously, in this case, the emitter configured to emit the light signal is configured to emit a continuous light signal and/or a discontinuous light signal and/or a modulated light signal.

Furthermore, in a third embodiment, the emitter is configured to emit a sound signal, preferably modulated. Advantageously, in this case, the modulated sound signal is encrypted.

Furthermore, in a fourth embodiment, the emitter configured to emit a signal generated by a chemical substance is configured to apply, as chemical substance, a coloring substance. Advantageously, the emitter is configured to apply the coloring substance, either remotely or by contact. Furthermore, advantageously, the coloring substance is one of the following substances: a photoluminescent substance, a phosphorescent substance, a fluorescent substance.

Furthermore, in a fifth embodiment, the emitter configured to emit a signal generated by a chemical substance is configured to apply, as chemical substance, an olfactory substance. Advantageously, in this case, the emitter is configured to project or spray the olfactory substance.

Furthermore, in a particular embodiment, the emitter is linked to the drone in one of the following ways:
  it is attached to the drone;
  it is removably mounted on the drone and is provided with at least one attachment element configured to allow said emitter to be attached to a support;
  it is towed by the drone.

Furthermore, advantageously, the drone comprises at least one of the following units:
  an automatic guidance unit comprising a central unit configured to automatically determine guidance commands and a guidance system configured to automatically guide the drone according to these determined guidance commands;

a remote guidance unit comprising a reception unit configured to receive guidance commands and a guidance system configured to automatically guide the drone in accordance with these received guidance commands.

The present invention also relates to a target tracking system. According to the invention, said target tracking system comprises:
- at least one target marking device, such as the one mentioned above; and
- at least one mobile machine, for example a drone or an aircraft or a weapon system such as a missile, comprising at least one detector capable of detecting at least one signal emitted by said at least one emitter of said drone of the target marking device, in order to track the target.

The present invention also relates to a target processing system. According to the invention, said target processing system comprises at least one target tracking system, such as the one mentioned above, and the mobile machine, in particular flying, in particular a missile, comprises means for processing a tracked target.

Said target tracking system and said target processing system in accordance with the present invention can be implemented in various applications.

In particular, in a first application:
said target marking device is a device for marking a target to be neutralized, for example a tank; and
said mobile machine is a missile designed to neutralize (destroy) that target. The target marking device thus has an emitter capable of emitting a positional information, and thus capable of marking a target so that this target can be neutralized by a neutralization (or processing) means such as a missile for example.

Furthermore, in a second application:
said target marking device is a device for tracking one or more persons in distress; and
said mobile machine is a rescue vehicle, preferably a rescue aircraft.

BRIEF DESCRIPTION OF FIGURES

The figures of the attached drawing will make it clear how the invention can be realized. In these figures, identical references designate similar elements.

FIG. 6 schematically illustrates an emitter according to a third embodiment.

FIG. 7 schematically illustrates an emitter according to a fourth embodiment.

FIG. 8 schematically illustrates an emitter according to a fifth embodiment.

DETAILED DESCRIPTION

Figure 1:
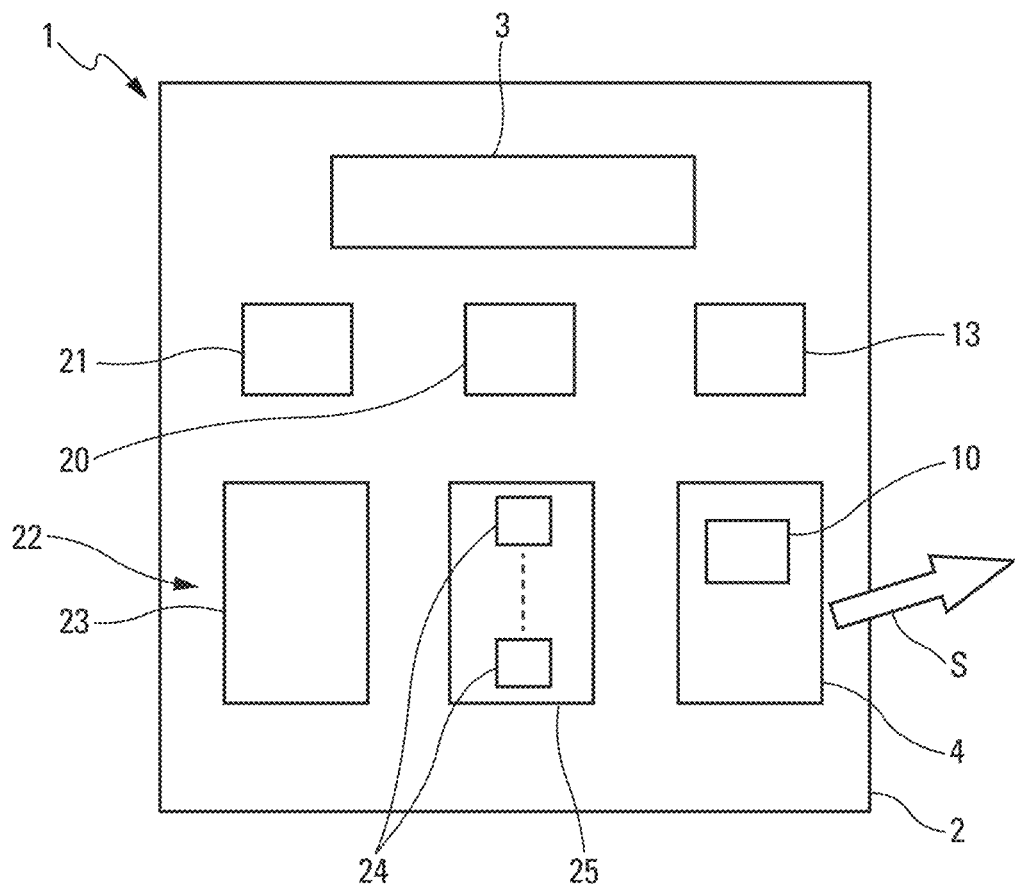
FIG. 1 is a block diagram of a target marking device which illustrates a particular embodiment of the invention.

The device 1 shown schematically in FIG. 1 and allowing to illustrate the invention is intended at least to mark a target, namely an object or a person of interest.

Figure 2:
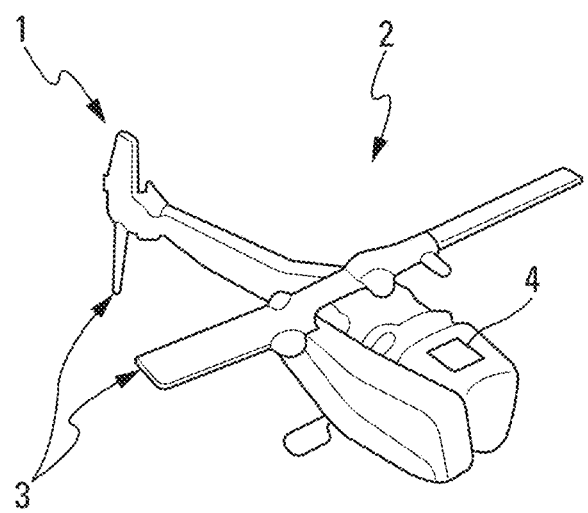
FIG. 2 is a schematic perspective view of a drone example of a target marking device.

This target marking device 1 comprises at least one drone 2 shown, by way of illustration, in a particular example in FIG. 2. The drone 2 comprises usual means 3 (in particular means for lifting (fixed wing, rotating wing, . . . ) and for generating a forward force)), which are schematically represented and which are formed in such a way as to make the drone 2 fly.

The drone 2 is provided with at least one emitter 4 capable of transmitting a signal (representing a positional information) which is schematically illustrated by an arrow S in FIG. 1.

The emitter 4 comprises an activation element 10 (controllable) for activating it to emit at least one signal representing the positional information at least at a given time. Furthermore, as specified below, the emitter 4 is configured to emit at least one of the following signals: an infrared signal, a light signal, a sound signal, a signal generated by a chemical substance.

Thus, the target marking device 1 can emit various signals (other than radio frequency signals), for which, in the case of a military application, the risk of finding appropriate (able to detect it) detectors (enemy) is low. Therefore, a target marking device 1 provided with an emitter 4 is available which is very discreet, allowing it to approach in the vicinity of a target without being detected if necessary.

The emitter 4 (intended to emit a signal) is considered to be discreet, in particular because it is not active in a radioelectric point of view and does not transmit a radio frequency signal.

Furthermore, the activation element 10 can be controlled (via a control unit 13 integrated or not in the emitter) to activate the emission of the signal at given times, and in a particular manner, for example intermittently for certain applications, thereby allowing to carry out a signal emission that is discreet and/or highly efficient (i.e. easily detectable by an associated suitable detector), as desired, depending on the application and the need. The activation element 10 may be controlled to activate the emission when particular conditions are met, for example when the drone 2 is in contact with the target. These conditions may be determined automatically on board the drone 2 or may be received from outside the drone 2 (for example via a unit 22 specified below).

The signal emitted by the emitter 4 can be detected by an appropriate detector 5 (FIG. 3), specified below. When the signal is emitted from the target C (schematically shown in FIG. 3) or from the environment close to the target C, by detecting said emitted signal 4 and identifying its position, one is able to track and position the target C.

Figure 4:
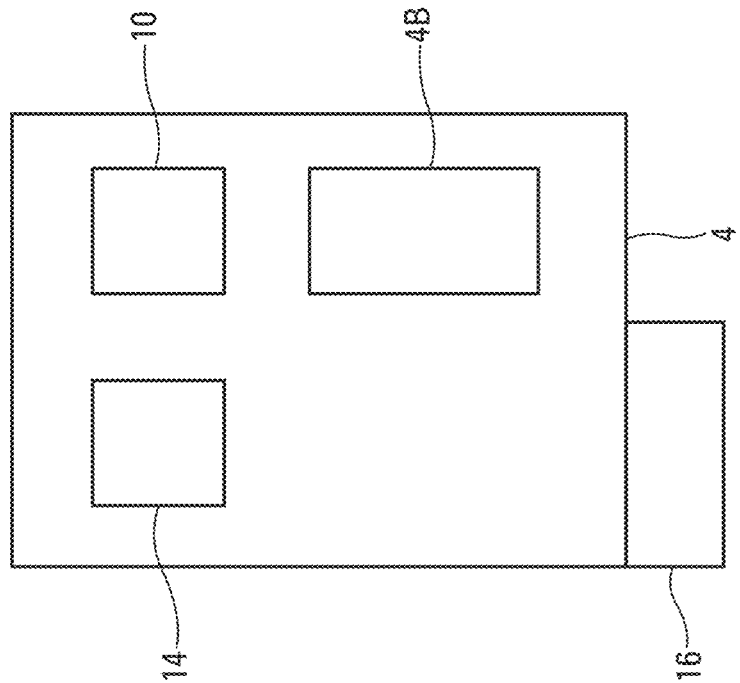
FIG. 4 schematically illustrates an emitter according to a first embodiment.
Figure 9:
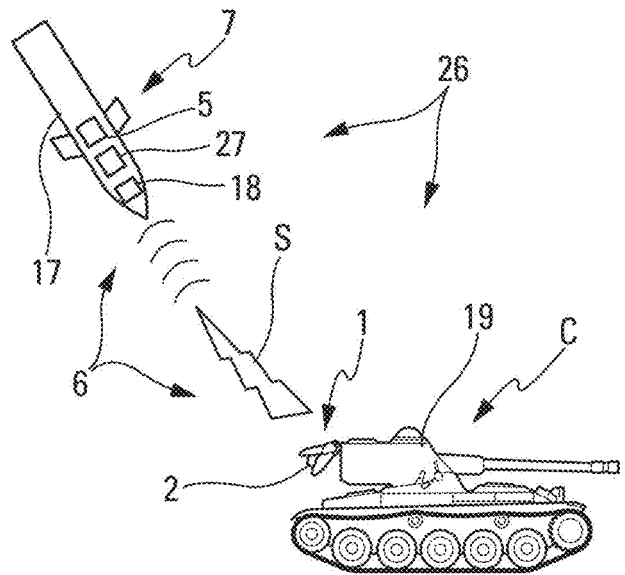
FIG. 9 illustrates a first example of target processing system provided with a target marking device, in the military field, applied to the neutralization of an enemy tank.

In a particular embodiment, the emitter 4 is linked to the drone 2 in one of the following ways:
  it is attached to the drone 2. In this case, to mark a target C, for example a tank 19, the drone 2 can land directly on the target C, as shown in FIG. 9;
  it is linked to the drone 2 without being in contact by means of a link, for example a wire 15 as shown in the example of FIG. 4, and it is towed by the drone 2;
  it is removably mounted on the drone 2 and is provided with at least one attachment element configured to allow said emitter 4 to be attached to a support.

Figure 5:
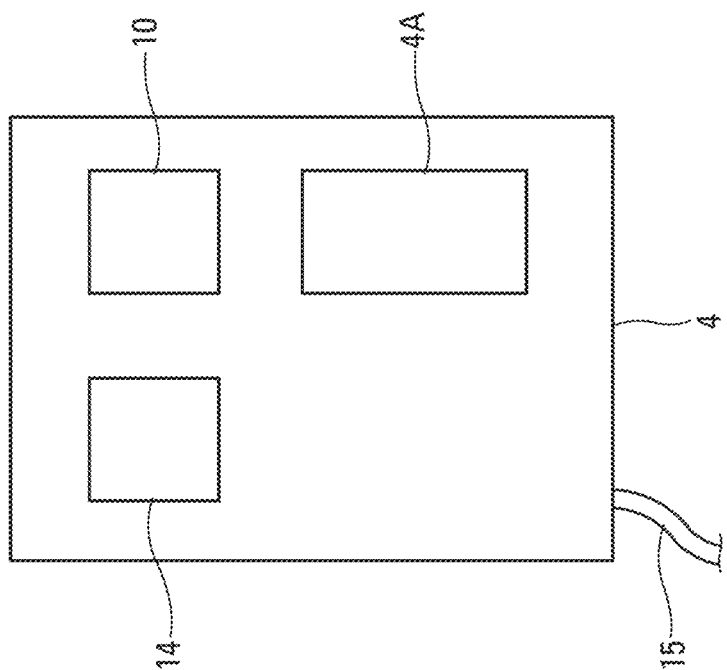
FIG. 5 schematically illustrates an emitter according to a second embodiment.

In this last embodiment, the emitter 4 is thus provided with at least one attachment element 16, as illustrated in the example of FIG. 5, which allows said emitter 4 to be attached to a support (other than the drone 2) and in particular to a target. In this case, the drone 2 lands on the target C and releases the emitter 4 which is attached to the target C, using the attachment element 16. The drone 2 may then move away from the target C, so as not to be hit during a treatment or a destruction of the target C and/or to perform another mission. In particular, the drone 2 may comprise a plurality of removable emitters 4 that it may place successively on different targets.

The attachment element 16 for attaching (or hooking) the emitter 4 to a target C, may comprise at least one of the elements: a chemical adhesive, a magnet, a suction cup, a mechanical fastener, etc.

Figure 3:
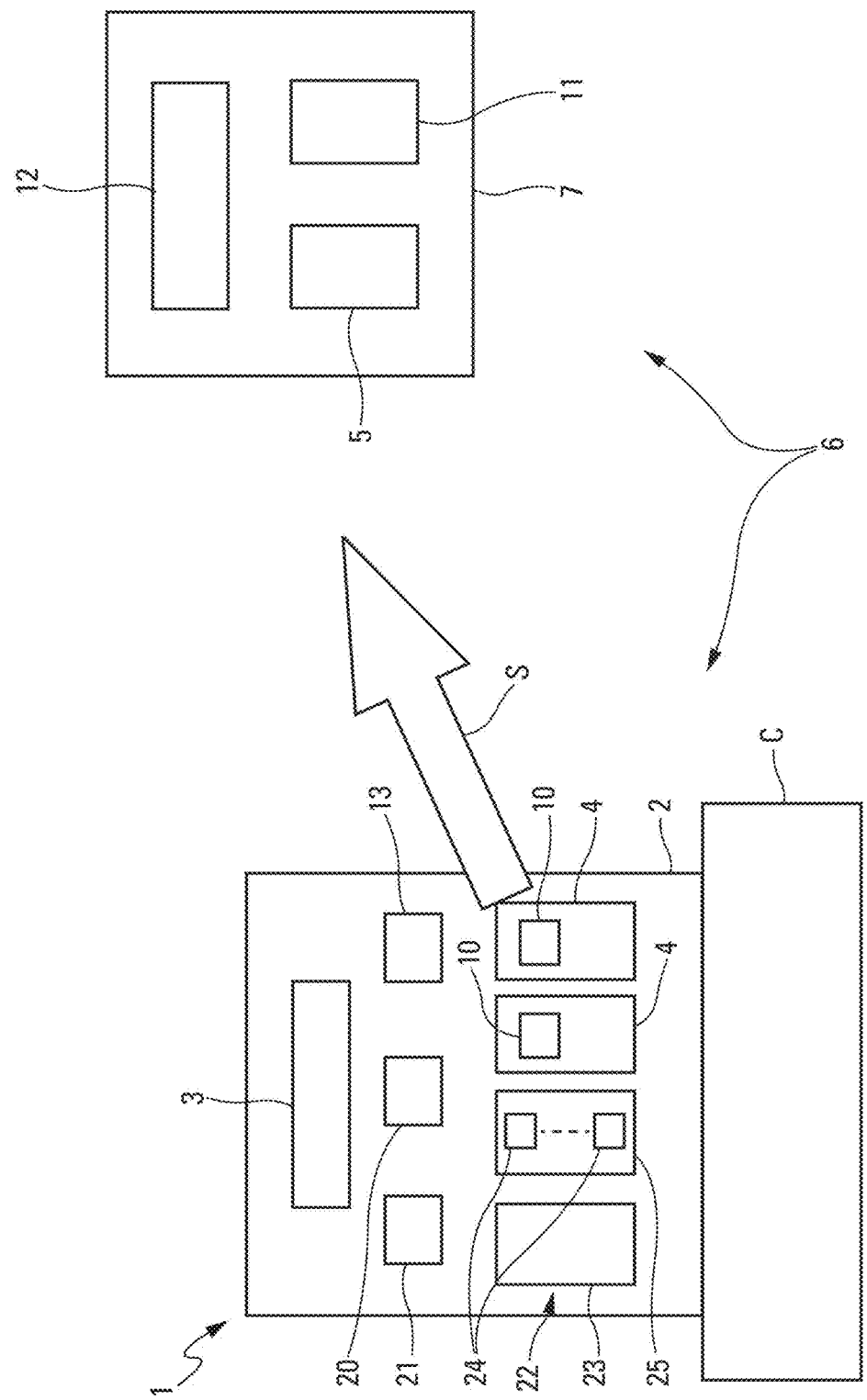
FIG. 3 is a block diagram of a target tracking system with a target marking device.

Generally speaking, the drone 2 may comprise a plurality of emitters 4, as shown in the example in FIG. 3 where it comprises two. In a particular embodiment, the drone 2 is provided with at least two emitters 4 of the same type, which allows to have one or more other emitters available in case of malfunction of one of the emitters, or which allows, in certain applications, to increase the intensity of the emitted signal by operating several emitters simultaneously.

Alternatively and/or additionally, the drone 2 is provided with at least two emitters 4 of different types, which increases the flexibility of use of the target marking device 1.

In a preferred embodiment, the target marking device 1 is part of a target tracking system 6.

Said target tracking system 6 comprises, as shown in FIG. 3:
at least one target marking device 1; and
at least one mobile machine 7, the mobile machine 7 comprising at least one detector 5 capable of detecting a signal emitted by the emitter 4 of said drone 2 of the target marking device 1 to track the target C.

The mobile machine may be a land or sea machine.

In a preferred application, the mobile machine is a flying machine 7 which comprises, as shown in FIG. 3:
the detector 5 capable of detecting the signals (i.e. positional information), emitted by the emitter 4 of the target marking device 1;
a management unit 11 formed so as to manage (or process) in particular this positional information, with a view to guiding the flying machine and/or their transmission to an auxiliary remote station or machine; and
conventional means 12 (in particular lifting means (wing, aileron, etc.) and means for generating a forward force (jet engine, rotating wing, etc.)), which are shown schematically and which are formed in such a way as to make the flying machine 7 fly.

The mobile machine 7 may correspond to any machine, in particular flying, which is capable of approaching sufficiently close to the drone 2 or to a target C for the detector 5 to be capable of detecting a signal emitted by the emitter 4 of a target marking device 1.

By way of illustration, the flying machine 7 may be a drone or an aircraft. The flying machine 7 may also correspond to a weapon system such as a missile 17, as illustrated in FIG. 9. In this case, in a preferred military application, the missile 17 comprises a homing device 18 that guides it to the signal S emitted by the target marking device 1 and detected by a detector 5 on board said missile 17.

The target tracking system 6 may be implemented in various applications as specified below.

Furthermore, in the scope of the present invention, the emitter 4 may be of different, widely varying types, as specified below, which allows a flexibility in the use or implementation of the target marking device 1.

In a first embodiment shown in FIG. 4, the emitter 4 comprises an emission element 4A configured to emit an infrared signal.

This emitter 4 carries out a marking via an infrared signature. It is configured to signal the target or its immediate environment by means of an element with a strong infrared signature to facilitate the tracking of the target.

In a particular embodiment, the emission element 4A is a thermal (or caloric) tag.

In the case of a military application as discussed above, the thermal tag has a sufficient IR signature that the homing device 18 of a missile 17 (FIG. 9) and the processing of the homing device can extract it from a video stream and track it.

In a particular embodiment, the emitter 4 comprises an activation element 10 configured to activate the thermal tag. The activation element 10 is configured to activate the thermal tag at the appropriate time, and for a sufficient period of time to allow the detection of the infrared signal, and thus of the target that is marked by the infrared signal.

In the case of a particular military application, such as shown in FIG. 9 for example, comprising a missile 17 which is guided by a homing device 18 towards the signal S detected by the detector 5, the thermal tag 4B may for example be activated as the missile 17 approaches the target C, in this case a tank 19. In this case, the activation time can range from a few seconds to a few tens of seconds, carrying out a compromise between efficiency and discretion.

In a particular embodiment, the emitter 4 comprises a control element 14 configured to modulate the infrared signal emitted by the emission element 4A in order to facilitate its identification, in particular in case of infrared noise in the environment of the target. This allows to facilitate the tracking and the identification of the infrared signal by the homing device 18 of the missile 17 or by an operator having a video on which said infrared signal is reproduced.

By way of example, the emitter 4 may comprise, as thermal tag 4A:
a low-intensity chemical heat source. In this case, a chemical reaction is used to produce heat which represents the infrared signal; and/or
a high intensity chemical heat source. In this case, the high-signature thermal tag may comprise a "self-protection decoy" type powder cartridge; and/or
a heat source of electrical origin. In this case, a resistive material and a high intensity current allow to produce, punctually, a large amount of heat, which represents the infrared signal.

The emitter 4 is linked to the drone 2 in one of the following ways:
it can be attached to the drone 2. To mark a target C, for example a tank 19, the drone 2 lands directly on the target C, as shown in FIG. 9; or
it can be linked to the drone 2 without being in contact by means of a link, for example the wire 15 (FIG. 4), and it is then towed by the drone 2; or
it can be removably mounted on the drone 2 and is provided with at least one attachment element configured to allow said emitter to be attached to a support.

The attachment element for attaching (or hooking) the emitter 4 to a target C may comprise at least one of the following elements: a magnetic device, an adhesive, a harpoon, a suction cup, etc.

With an emitter 4 corresponding to this first embodiment, the target tracking system 6 comprises (on the mobile machine 7) a detector 5 which is capable of detecting such an infrared signal. This detector 5 may, for example, be integrated into (or associated with) the homing device of a missile.

In a second embodiment shown in FIG. 5, the emitter 4 comprises an emission element 4B configured to emit a light signal. In this case, the light signal is a continuous light signal or a discontinuous light signal.

In one particular embodiment, the emission element 4B may be a light-emitting diode (LED).

This emission element 4B on board the drone 2 is configured to generate a light signal in a continuous or discontinuous manner (and in particular in a modulated manner).

In a particular embodiment, the emitter 4 comprises a control element 14 configured to control the emission element 4B in order to emit either one or the other of these light signals, and preferably first a discontinuous light signal and then a continuous light signal.

The discontinuity of the light signal may correspond to a flash that is emitted repeatedly at a given frequency, for example, while the continuity of the signal may be similar to a flashlight.

A particular implementation of a discontinuous light signal may be a modulated signal. This modulation consists of emitting the (discontinuous) light signal at successive time intervals that are predetermined and therefore known. This can in particular allow to facilitate the detection, in particular in the presence of light noise, or contribute to the discretion.

The emission of a discontinuous light signal allows to generate a higher light intensity over a short period of time (of the order of 1/1000 seconds). Because of the higher light intensity, the sensor of the mobile machine, for example a missile, will be capable of detecting it at a longer distance. However, as the signal is not continuous, the tracking is less accurate. Therefore, it is advantageous to emit a continuous signal at a shorter distance (when the mobile machine approaches the emitter). The control element 14 may be configured to switch the emission from one emission mode to another, for example in response to requests from a command post.

The emission can therefore be adapted to the course of the mission.

With an emitter 4 corresponding to this second embodiment, the target tracking system 6 comprises (on the mobile machine 7) a detector 5 which is capable of detecting such a light signal.

Furthermore, in a third embodiment shown in FIG. 6, the emitter 4 comprises an emission element 4C configured to emit a sound signal, for example audible sounds or ultrasound.

This sound signal may correspond to a sound signal with frequencies spanning a wide spectrum of sound, from inaudible to audible frequencies. The sound spectrum corresponds to the frequencies from 30 Hz to 30 kHz. The signature must be sufficiently distinctive and discriminating to be detected in the environment of interest.

In a preferred embodiment, the emitter 4 comprises a control unit 14 configured to control the emission element 4C in order to emit a modulated sound signal.

The modulation corresponds to an encrypted signal. The modulation can be carried out in frequency, i.e. the frequency changes over time, in amplitude, in phase, in pulse or in a combination of several of these different ways.

The emission element 4C may comprise a simple microphone emitter and its reception device, or piezoelectric transducers for emitting ultrasound.

With an emitter 4 corresponding to this third embodiment, the target tracking system 6 comprises (on the mobile machine 7) a detector 5 which is capable of detecting such a sound signal.

Furthermore, in a fourth embodiment shown in FIG. 7, the emitter 4 comprises an emission element 4D which is configured to emit (or apply) a chemical substance, namely a coloring substance.

In this case, the emitter 4 is configured to emit the coloring substance, either remotely or on contact.

For example, the emission element 4D is configured to deposit photoluminescent paint, phosphorescent paint, or fluorescent UV paint as coloring substance on the target. The deposition of the coloring substance on the target by the 4D emission element can be performed at a distance from the target or in contact with the target.

In a particular embodiment, the emitter 4 comprises an activation element 10 configured to activate the 4D emission element to emit the coloring substance at the appropriate time.

In a particular embodiment, the 4D emission element comprises a firing mechanism allowing to eject a capsule containing the coloring substance. The impact of the capsule on the target, leading to the destruction of the capsule, allows the deposition of the coloring substance on the target.

Furthermore, in another particular embodiment, the 4D emission element comprises an aerosol can containing the coloring substance. The activation element 10 triggers the aerosol can in order to spray the coloring substance onto the target at the appropriate time, such as when the drone is in contact with the target.

Such an emitter 4 is completely passive.

With an emitter 4 corresponding to this fourth embodiment, the target tracking system 6 comprises (on the mobile machine 7) a detector 5 which is capable of detecting such a coloring substance.

In the case of the use of a phosphorescent or photoluminescent substance, the detector 5 may comprise an optronic camera or a detector capable of detecting a light intensity. In the case of the use of a fluorescent UV substance, the detector 5 may comprise an UV camera.

Furthermore, in a fifth embodiment shown in FIG. 8, the emitter 4 comprises an emission element 4E which is configured to emit (or apply) a chemical substance, namely an olfactory substance. More particularly, the emission element 4E is configured to project or spray the olfactory chemical (generating an olfactory signal).

The olfactory substance with an olfactory signature is therefore deposited on the target, by spraying or by mechanical projection. It is chosen to be sufficiently discriminating so that it can be detected in the environment. Thus deposited, the olfactory substance allows to mark the target. The olfactory substance can in particular be detected by an animal, in particular a dog.

Such an emitter 4 is completely passive.

With an emitter 4 corresponding to this fourth embodiment, the target tracking system 6 comprises (on the mobile machine 7) a detector 5 which is capable of detecting such an olfactory signal.

In a particular embodiment, the detector 5 comprises an electronic nose, of sufficient range to track the olfactory signal at a distance compatible with the intended application. In the case where the mobile machine of the target tracking system 6 is a discreet airborne drone, this distance may be a few meters.

Characteristics of a particular embodiment of the drone 2 are specified below.

The drone 2 is formed in order to fly, for example at a low height, while being guided by means of guidance commands.

To do this, the drone 2 comprises, as shown in FIG. 1:
- an onboard automatic guidance unit 20, which is configured to automatically guide the drone 2. The automatic guidance unit 20 comprises a central unit configured to automatically determine guidance commands and a guidance system configured to automatically guide the drone 2 in accordance with these determined guidance commands. The drone 2 can thus be guided automatically without (or with limited) intervention of an operator; and/or
- a remote guidance unit 21 for carrying out a remote guidance of the drone 2. The remote guidance unit 21 comprises a reception unit (e.g. the unit 22) configured to receive guidance commands and a guidance system configured to automatically guide the drone in accordance with such received guidance commands.

The drone 2 may also comprise a data transmission unit 22 that comprises an emission/reception element 23. This emission/reception element 23 is mounted on the drone 2 and is formed so as to emit and receive signals of electromagnetic type, in order to remotely transmit data (in particular data relating to measurements carried out by at least one sensor 24 or one detector 5 of the drone) from the drone 2 and to receive commands, for example for guidance, at the level of the drone 2. For this purpose, the data transmission unit 22 also comprises at least one other remote emission/reception element which is arranged remotely, for example at the level of a remote station, in particular on the ground, and which is capable of exchanging information with the emission/reception element 23 mounted on the drone 2 in the usual way. The remote emission/reception element can also be arranged on a mobile machine, for example a flying machine.

Furthermore, preferably, the drone 2 may be provided with one or more sensors 24 which are, in particular, capable of measuring parameters of the environment.

In a preferred embodiment, the drone 2 is provided with at least one sensor 24 capable of generating an image of at least one part of the environment of the drone 2, and the data transmission unit 22 is configured to transmit this image to the remote station, which allows a remote operator to view the environment of the drone 2 and in particular of a target C. In the example shown in FIG. 1, the drone 2 is provided with an assembly 25 comprising a plurality of sensors 24.

Thanks to the data transmission unit 22, allowing the drone 2 to communicate with a remote station (not shown), an operator (located at the level of this station) can receive data, in particular data from the environment of the drone 2, and send it guidance commands to guide it remotely (via the remote guidance unit 21).

In the scope of the present invention, the drone 2 may have various sizes.

In a particular embodiment (non-limiting), the drone 2 is such that it can fit into a cube of 3 meters sides.

Furthermore, in a particular embodiment of this particular embodiment, the drone 2 is of the "Nano-drone" type and preferably has the following characteristics:
- a flight altitude of between 0 and 50 meters,
- a size smaller than that of a cube of twenty centimeters sides, i.e. of which: L<20 cm, I<20 cm, h<20 cm (where L: length; I: width; h: height); and
- a distance of approach of the drone 2 with respect to an objective (target) which is located between 0 meter (or direct contact) and 10 meters depending on the case.

The target marking device 1 provided with such a drone 2, which in this case has a reduced size allowing it to fly at a low height without being detected, is thus able to approach a target C in a discreet manner.

The miniaturization of the drone 2 (observation and acquisition) allows to easier carry out at least some of the following functions:
- approaching a target C;
- observing a target C;
- marking a target C;
- transmitting information; and
- providing a mission report.

Said target tracking system 6, as described above, may be implemented in various applications, and in particular in a target processing system 26.

The target processing system 26 comprises, in this case, as shown in FIG. 9, at least one target tracking system 6, such as the one mentioned above. Furthermore the flying machine 7, in particular a missile 17, is preferably autonomous, and it comprises means 27 (e.g. a warhead) for processing a tracked target, in this case a tank 19.

In the context of the present invention, the processing of a target is understood to mean acting on this target, for example to neutralize it, destroy it, carry it away, etc. More generally, the means for processing a target are therefore usual means for, for example, destroying, neutralizing or carrying away the target.

The flying machine 7 comprises in this case:
- the detector 5 capable of detecting the signals (i.e. positional information), emitted by the emitter 4 of the target marking device 1;
- the management unit 11 (FIG. 3) formed so as to manage (or process) in particular this positional information, with a view to guiding the flying machine 7; and
- the means 12 (FIG. 3) formed in order to fly the flying machine; and
- the means 27 for processing the target, for example a warhead.

Furthermore, in another application, the target tracking system 6, as described above, can be implemented during natural disasters (earthquake, avalanche, etc.) or accidents (explosions, etc.) for example of industrial origin. We know that often, during natural disasters or certain industrial accidents in particular, the emergency services have great difficulty in identifying the injured, for example in rubble or under the snow. For example, one or more injured may be under rubble, and it is very difficult to identify the injured by flying over the disaster area from a high altitude. Another problem is that sometimes we have to deal with a large number of injured at the same time, which means that we have to choose the priority targets.

Figure 10:
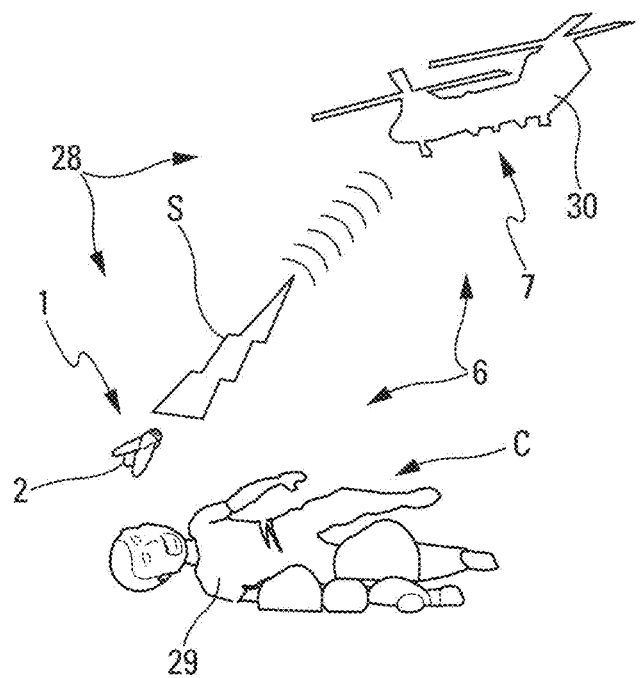
FIG. 10 illustrates a second example of a target processing system provided with a target marking device, applied to the rescue of a person in distress.

In this particular case of target processing system 28, as shown in FIG. 10:
- the target marking device 1 is a device for tracking persons 28 in distress. More specifically, the drone 2 is responsible for exploring the accident or disaster area, searching for persons 28 and emitting a signal S when a wanted person or persons 28 are tracked; and
- said mobile machine 7 is a rescue vehicle, in particular a rescue aircraft such as a helicopter 29, which is provided with at least one detector capable of detecting the signal emitted by the emitter 4 of the target marking device 1 and which has the capacity to rescue the injured.

The invention claimed is:

1. A target marking device, said device comprising at least one drone provided with at least one emitter capable of emitting a positional information,
   characterized in that the emitter comprises an activation element for activating said emitter so that it emits at least one signal representing the positional information at least at a given time, and in that the emitter is configured to emit a modulated sound signal, wherein the modulated sound signal is encrypted.

2. The device according claim 1, characterized in that the drone is provided with at least two emitters.

3. The device according to claim 2, characterized in that the drone is provided with at least two emitters of different types.

4. The device according to claim 1, characterized in that said emitter is linked to the drone in one of the following ways:
   said emitter is attached to said drone:
   said emitter is removably mounted on said drone and is provided with at least one attachment element configured to allow said emitter to be attached to a support;
   said emitter is towed by the drone.

5. The device according to claim 1, characterized in that said drone comprises at least one of the following units:
   an automatic guidance unit comprising a central unit configured to automatically determine guidance commands and a guidance system configured to automatically guide the drone according to guidance commands determined by the central unit;
   a remote guidance unit comprising a reception unit configured to receive guidance commands and a guidance system configured to automatically guide the drone according to received guidance commands.

6. A target tracking system, characterized in that it comprises:
   at least one target marking device as specified in claim 1; and
   at least one mobile machine comprising at least one detector capable of detecting at least one signal emitted by said at least one emitter of said drone of the target marking device, in order to track the target.

7. A target processing system, characterized in that it comprises at least one target tracking system, as specified in claim 6, and in that the mobile machine, in particular a missile, comprises means for processing a tracked target.

8. The device according to claim 1, characterized in that the drone is provided with at least two emitters of different types, one of the at least two emitters being the emitter configured to emit the modulated sound signal, and another of the at least two emitters being configured to emit an infrared signal.

9. The device according to claim 8, characterized in that the emitter configured to emit an infrared signal comprises one of the following heat sources: a heat source of chemical type, a heat source of electrical type.

10. The device according claim 1, characterized in that the drone is provided with at least two emitters of different types, one of the at least two emitters being the emitter configured to emit the modulated sound signal, and another of the at least two emitters being configured to emit a light signal.

11. The device according to claim 10, characterized in that the emitter configured to emit a light signal is configured to emit a continuous light signal and/or a discontinuous light signal and/or a modulated light signal.

12. The device according claim 1, characterized in that the drone is provided with at least two emitters of different types, one of the at least two emitters being the emitter configured to emit the modulated sound signal, and another of the at least two emitters being configured to emit a signal generated by a chemical substance.

13. The device according to claim 12, characterized in that the emitter configured to emit a signal generated by a chemical substance is configured to apply, as chemical substance, a coloring substance.

14. The device according to claim 13, characterized in that the emitter is configured to apply the coloring substance, either remotely or by contact.

15. The device according to claim 13, characterized in that the coloring substance is one of the following substances: a photoluminescent substance, a phosphorescent substance, a fluorescent substance.

16. The device according to claim 12, characterized in that the emitter configured to emit a signal generated by a chemical substance is configured to apply, as chemical substance, an olfactory substance.

17. The device according to claim 16, characterized in that the emitter is configured to project or spray the olfactory substance.

* * * * *